(12) United States Patent
Choi et al.

(10) Patent No.: US 9,417,377 B2
(45) Date of Patent: Aug. 16, 2016

(54) DISPLAY DEVICE

(71) Applicant: SAMSUNG DISPLAY CO., LTD., Yongin, Gyeonggi-Do (KR)

(72) Inventors: Sung Jin Choi, Hwaseong-si (KR); Dong Ho Kim, Seoul (KR); Bong Jun Park, Suwon-si (KR); Yong Son, Suwon-si (KR); Yi Seul Song, Uiwang-si (KR); Jin Ho Oh, Seoul (KR); Jee Hoon Han, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 165 days.

(21) Appl. No.: 14/473,935

(22) Filed: Aug. 29, 2014

(65) Prior Publication Data

US 2015/0277026 A1    Oct. 1, 2015

(30) Foreign Application Priority Data

Mar. 26, 2014    (KR) .................. 10-2014-0035349

(51) Int. Cl.
*F21V 8/00*    (2006.01)

(52) U.S. Cl.
CPC ............ *G02B 6/0055* (2013.01); *G02B 6/0063* (2013.01)

(58) Field of Classification Search
CPC .......................... G02B 6/0055; G02B 6/0063
See application file for complete search history.

(56) References Cited

FOREIGN PATENT DOCUMENTS

| | | |
|---|---|---|
| JP | 2005-250063 A | 9/2005 |
| JP | 2008-077119 A | 4/2008 |
| KR | 10-2004-0032462 A | 4/2004 |
| KR | 10-2006-0038130 A | 5/2006 |
| KR | 10-0785025 B1 | 12/2007 |
| KR | 10-2010-0044626 A | 4/2010 |
| KR | 10-2010-0082211 A | 7/2010 |
| KR | 10-2013-0070101 A | 6/2013 |
| WO | WO 2006/044292 A1 | 4/2006 |

*Primary Examiner* — Mary Ellen Bowman
(74) *Attorney, Agent, or Firm* — Lewis Roca Rothgerber Christie LLP

(57) ABSTRACT

A display device in a display panel; a backlight unit configured to provide light to the display panel, the display pan& being arranged at a side of a first surface of the backlight unit; and a first light adjustment unit configured to be arranged at a side of a second surface of the backlight unit opposite to the first surface of the backlight unit, the first light adjustment unit including a plurality of reflection portions, reflection portions of the plurality of reflection portions being rotatable so as to be switchable between a light transmission mode and a light reflection mode.

20 Claims, 7 Drawing Sheets

DISPLAY DEVICE

CROSS-REFERENCE TO RELATED APPLICATION

This application claims priority to and the benefit of Korean Patent Application No 10-2014-0035349, filed on Mar. 26, 2014 in the Korean Intellectual Property Office, the entire content of which is incorporated herein by reference.

BACKGROUND

1. Field

Aspects of embodiments of the present invention relate to a display device.

2. Description of the Related Art

In a typical liquid crystal display ("LCD"), two substrates each having electric field generating electrodes formed thereon are arranged in such a manner that their surfaces where the electric field generating electrodes are formed face each other, and liquid crystal molecules are injected between the two substrates. Then, in response to a voltage being applied to the electric field generating electrodes on each of the two substrates, an electric field is generated. As a result, the alignment of the liquid crystal molecules changes, and the transmittance of the LCD changes accordingly. In this manner, the LCD may display an image.

The LCD cannot emit light itself, and can merely adjust the transmission of light. Accordingly, the LCD needs an additional source of light to display an image. For this a backlight may be provided at the rear of a liquid crystal panel of the LCD, and light emitted from the backlight may be guided to be incident upon the liquid crystal panel. An image may be displayed by adjusting the transmission of light based on the alignment of the liquid crystal molecules.

Since the backlight is generally required to provide high luminance, many light source modules may be provided in the backlight. Accordingly, the backlight can be used as an indoor lighting device as long as it can provide sufficient brightness.

SUMMARY

According to an aspect of one or more exemplary embodiments of the present invention, a display device with a backlight can be used as a lighting device.

However, aspects of embodiments of the present invention are not restricted to those set forth herein with respect to some exemplary embodiments. Rather, aspects and features of embodiments of the present invention will become more apparent to one of ordinary skill in the art to which the invention pertains with reference to the detailed description of one or more exemplary embodiments provided below in conjunction with the drawings.

According to one or more embodiments of the present invention, a display device includes: a display panel; a backlight unit configured to provide light to the display panel, the display panel being arranged at a side of a first surface of the backlight unit; and a first light adjustment unit configured to be arranged at a side of a second surface of the backlight unit opposite to the first surface of the backlight unit, the first light adjustment unit including a plurality of reflection portions, reflection portions of the plurality of reflection portions being rotatable so as to be switchable between a light transmission mode and a light reflection mode.

According to another embodiment of the present invention, a display device includes: a display panel; a backlight unit configured to provide light to the display panel, the display panel being arranged at a side of a first surface of the backlight unit; a first roller configured to be arranged at a first side of the backlight unit; a second roller configured to be arranged at a second side of the backlight unit; and a light adjustment unit configured to be arranged at least in part between the display panel and the backlight unit and configured to be connected to the first, roller and the second roller, and the light adjustment unit includes a light reflection portion and a light transmission portion.

According to an aspect of one or more embodiments of the present invention, it is possible to provide both an image display function and a lighting function with a single display device.

According to another aspect of one or more embodiments of the present invention, it is possible to make better use of space by providing both an image display function and a lighting function with a single display device.

Other features and aspects of embodiments of the present invention will be apparent from the following detailed description, the drawings, and the claims.

DETAILED DESCRIPTION

Figure 1:
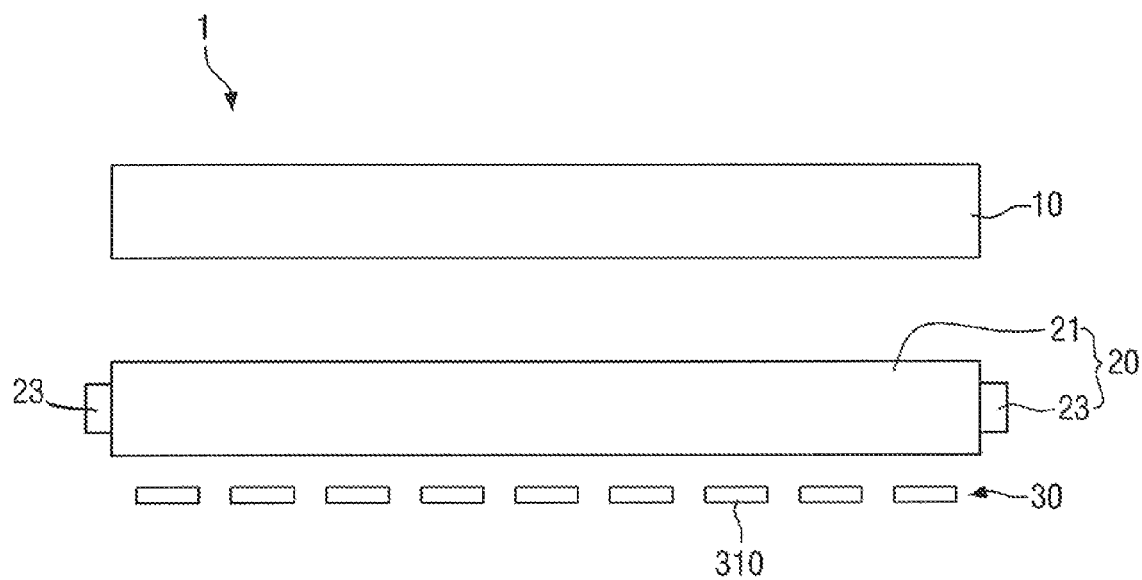
FIG. 1 is a cross-sectional view of a display device according to an exemplary embodiment of the invention.

Aspects and features of some exemplary embodiments of the present invention are described more fully hereinafter with reference to the accompanying drawings, in which some exemplary embodiments of the present invention are shown. This invention may, however, be embodied in different forms and should not be construed as limited to the embodiments set forth herein. Rather, these embodiments are provided in order to convey the scope of the present invention those skilled in the art. As those skilled in the art would realize, the described embodiments may be modified in various different ways, all without departing from the spirit or scope of the present invention. Like reference numbers are used to indicate like components throughout the specification. In the drawings, the thicknesses of layers and/or regions may be exaggerated for purposes of clarity.

It is to be understood that although the terms "first." "second" "third," etc., may be used herein to describe various elements, these elements should not be limited by these terms. These terms are merely used to distinguish one element from another element for purposes of description. Thus, a first element discussed below could be termed a second element without departing from the teachings of the invention.

Some of the terminology used herein is used for the purpose of describing particular embodiments only and is not intended to be limiting. For example, as used herein, the singular forms "a," "an," and "the" are intended to include the plural forms, including "at least one," unless the content clearly indicates otherwise. Also or can mean "and/or" unless indicated otherwise. As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for purposes of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation of above and below. The device may be otherwise oriented (e.g., rotated 90 degrees or at other orientations), and the spatially relative descriptors used herein may be interpreted accordingly.

Some exemplary embodiments are described hereinafter with reference to the accompanying drawings.

FIG. 1 is a cross-sectional view of a display device according to an exemplary embodiment of the present invention.

Referring to FIG. 1, a display device 1 according to an embodiment of the present invention includes a display panel 10, a backlight unit 20, and a first light adjustment unit 30.

The display panel 10, in one embodiment, may be a liquid crystal display ("LCD") panel, and may include a thin-film transistor ("TFT") substrate, a color filter substrate, and a liquid crystal layer interposed between the TFT substrate and the color filter substrate.

In one embodiment, the TFT substrate may be a transparent glass substrate on which a plurality of TFTs are formed and arranged in a matrix. A plurality of data lines are respectively connected to the source terminals of the TFTs, and a plurality of gate lines are respectively connected to the gate terminals of the TFTs. A plurality of pixel electrodes, which are formed of a transparent conductive material, may be respectively formed at the drain terminals of the TFTs. In response an electric signal being applied to the data lines and the gate lines, the TFTs may be turned on or off so as to apply an electric signal to the pixels at their drain terminals. In response to the TFTs being turned on by applying power to the gate and source terminals of the TFT substrate, an electric field may be generated between the pixel electrodes and a common electrode on the color filter substrate. As a result, the alignment of liquid crystal molecules in the liquid crystal layer between the TFT substrate and the color filter substrate may change, and the transmittance of the liquid crystal layer may vary accordingly. In this manner, the display device 1 may display a desired image.

The color filter substrate may include a plurality of color filters, and each of the color filters may include a plurality of sub-color filters. which realize red ("R"), green ("G"), and blue ("B"), respectively. The color filter substrate may also include a black matrix which separates the sub-color filters of each of the color filters from one another and blocks the transmission of light therethrough. In one embodiment, the common electrode may be formed on the entire surface of the color filter substrate. The common electrode may be formed of a transparent conductive material such as indium tin oxide ("ITO") or indium zinc oxide ("IZO").

The backlight unit 20, which provides light to the display panel 10, may be disposed below the display panel 10. The backlight unit 20 may include a light guide panel 21 and a light source module 23.

The light guide panel 21 may be formed as a rectangular plate, and may be formed of a transparent material that can refract light. In an exemplary embodiment, the transparent material may be a transparent polymer resin such as polycarbonate ("PC") or polymethyl methacrylate ("PMMA"), but embodiments of the present invention are not limited thereto. Further, in an exemplary embodiment, the light guide panel 21 may be formed of a rigid material, but embodiments of the present invention are not limited thereto. Further, in another exemplary embodiment, the light guide panel 21 may be formed of a flexible material.

The light source module 23 may provide light to the light guide panel 21, and the light provided to the light guide panel 21 may be white light. The light source module 23 may include a single type of light source such as a cold cathode fluorescent lamp ("CCFL") that can emit white light or may include different types of light sources emitting beams of different colors. In an exemplary embodiment, the light source module 23 may include three light sources, such as, for example, three light-emitting diodes ("LEDs") emitting R light, G light, and B light, respectively, The light source module 23 may be provided on at least one side of the light guide panel 21. The light source module 23 is illustrated in FIG. 1 as being provided on both sides of the light guide panel 21, but embodiments of the present invention are not limited thereto. In another embodiment, the light source module 23 may be provided on only one side of the light guide panel 21. In one embodiment, light provided by the light source module 23 travels through the inside of the light guide panel 21, undergoing total reflection in the light guide panel 21 and some of the light, may be emitted from the top or the bottom of the light guide panel 21. A fine structure (not illustrated), such as a hologram pattern, for example, may be formed on the top surface or the bottom surface of the light guide panel 21 to emit light outward.

The first light adjustment unit 30 may be disposed below the backlight unit 20, In one embodiment, the first light adjustment unit 30 is configured to be switched between a light transmission mode and a light reflection mode, and may include a plurality of first reflection portions 310 which are rotatable.

Each of the first reflection portions 310 may include a reflective surface (or a mirror) capable of reflecting light, and may be driven by a driving source to rotate. In an exemplary embodiment, the reflective surface may be formed of a metal such as aluminum, but embodiments of the present invention are not limited thereto. In an exemplary embodiment, the first reflection portions 310 may be micro electro-mechanical systems ("MEMS") mirrors or digital micro-mirror device ("DMD") devices, but embodiments of the present invention are not limited thereto.

The first light adjustment unit 30 may be switched between the light transmission mode and the light reflection mode due to the rotation of the first reflection portions 310. In an exemplary embodiment, a mode of operation of the first light adjustment unit 30 when the first reflection portions 310 substantially form an angle of 0 or 180 degrees with the backlight unit 20 or the light guide panel 21 may be set as the light reflection mode, and a mode of operation of the first light adjustment unit 30 when the first reflection portions 310 substantially form an angle of 90 degrees with the backlight unit 20 or the light guide panel 21 may be set as the light transmission mode. In this exemplary embodiment, the first light adjustment unit 30 may be switched between the light transmission mode and the light reflection mode by adjusting the rotation angle of the first reflection portions 310. However, embodiments of the present invention are not limited thereto, and, in other embodiments, the rotation angle of the first reflection portions 310 for setting the first light adjustment unit 30 to the light transmission mode or the light reflection mode may be different.

In response to the first light adjustment unit 30 being driven in the light transmission mode, the first reflection portions 310 may rotate to open the space therebetween, and, as a result, light provided by the backlight unit 20 may be emitted outward through the open space between the first reflection portions 310. In response to the first light adjustment unit 30 being driven in the light reflection mode, the first reflection portions 310 may rotate to close the space therebetween, and, as a result, light provided by the backlight unit 20 may be reflected by the first reflection portions 310 and may thus travel back toward the backlight, unit 20 or to the light guide panel 21. The operation of the display device 1 and the operation of the first light adjustment unit 30 will be described in further detail later herein.

Figure 2:
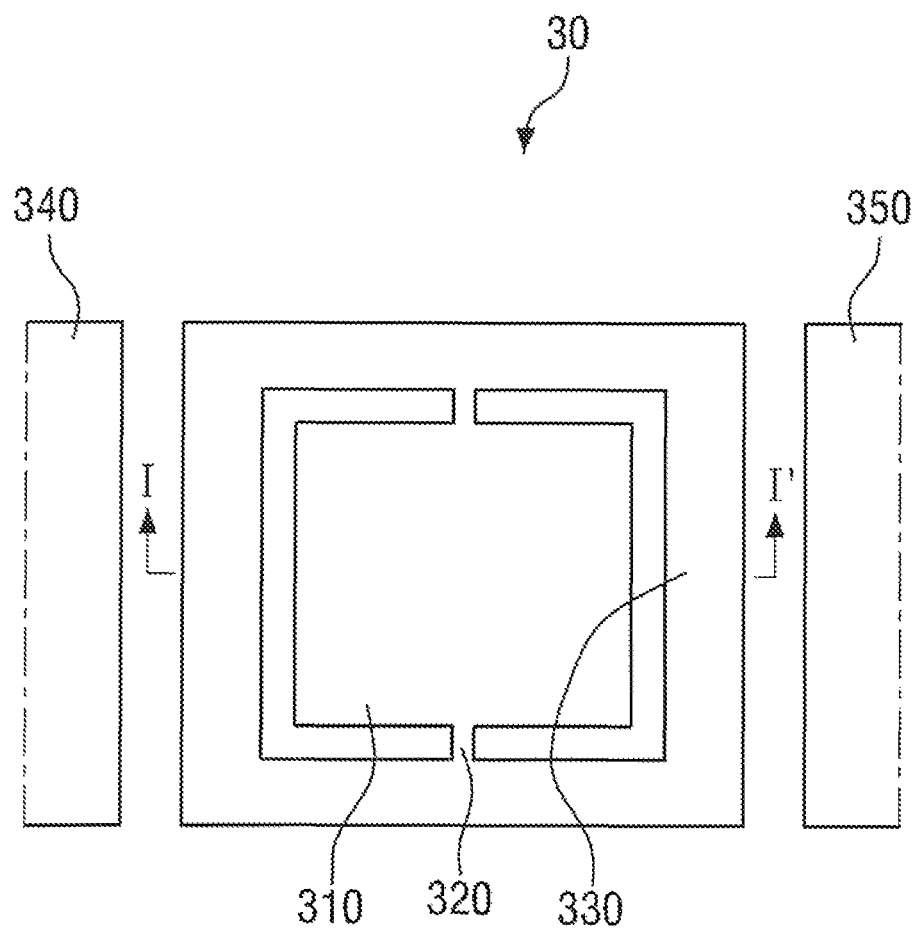
FIG. 2 is a top view of a first light adjustment unit of the display device lustrated in FIG. 1, according to an exemplary embodiment of the invention.
Figure 3:
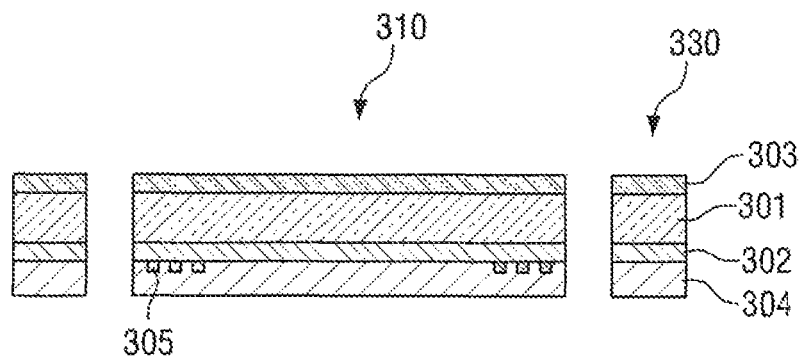
FIG. 3 is a cross-sectional view of the first light adjustment unit illustrated in FIG. 2, according to an exemplary embodiment of the invention.

FIG. 2 is a top view of the first fight adjustment unit 30 of the display device 1 illustrated in FIG. 1, according to an exemplary embodiment of the present invention. FIG. 3 is a cross-sectional view of the first light adjustment unit 30 illustrated in FIG. 2, according to an exemplary embodiment of the present invention. More specifically, FIG. 3 illustrates a cross-sectional view of the first light adjustment unit 30 taken along the line I-I' of FIG. 2, Referring to FIGS. 2 and 3, in one embodiment, the first light adjustment unit 30 may include a first supporting portion 330, a first reflection portion 310 provided inside the first supporting portion 330, and first torsion portions 320 rotatably connecting the first reflection portion 310 to the first supporting portion 330.

In one embodiment, first coils 305 may be provided at a lower part of the first reflection portion 310 so as to flow a current therethrough. A first magnet 340 and a second magnet 350, which have different polarities, may be provided on opposite sides of the first supporting portion 330. The first magnet 340 and the second magnet 350 may be provided outside the first supporting portion 330 to form bilateral symmetry with respect to a rotational axis of the first torsion portions 320 (or a vertical axis that passes through both the first torsion portions 320).

In one embodiment, the first reflection portion 310 and the first supporting portion 330 may be formed together in one body with each other. In an exemplary embodiment, a silicon substrate 301 with its residual stress relieved may be prepared, and a reflective layer 303 may be formed on the entire surface of the silicon substrate 301. In an exemplary embodiment, the reflective layer 303 may be formed as a thin aluminum layer with high reflectance against visible light, but embodiments of the present invention are not limited thereto.

A first insulating layer 302 may be formed below the silicon substrate 301, and the first coils 305 may be formed on the first insulating layer 302. Thereafter, a second insulating layer 304 may be formed on the first insulating layer 302 to cover the first coils 305. Thereafter, a resulting structure except for parts to be formed as the first torsion portions 320 may be subjected to etching, thereby forming the first reflection portion 310 and the first supporting portion 330.

In response to a current being applied to the first coils 305 in one direction, the first reflection portion 310 may rotate in a first direction about the vertical axis that passes through both the first torsion portions 320 due to a Lorentz force. In response to a current being applied to the coils 305 in the opposite direction, the first reflection portion 310 may rotate in a second direction, which is opposite to the first direction, about the vertical axis that passes through both the first torsion portions 320 due to a Lorentz force.

In an exemplary embodiment, the first light adjustment unit 30 may rotate the first reflection portion 310 by controlling the application of a current to the first coils 305 or the turning on or off of the first reflection portion 310, and may also rotate the first reflection portion 310 in accordance with the turning on or off of the display panel 10.

The structure of the first light adjustment unit 30, as illustrated in FIGS. 2 and 3, is merely one exemplary embodiment of the present invention and various modifications may be made thereto, as long as the first light adjustment unit 30 can be switched between the light transmission mode and the light reflection mode in response to the rotation of the first reflection portion 310. For example, the first light adjustment unit 30 may be configured to include a driving module which applies a driving force to the first reflection portion 310 so that the first reflection portion 310 may rotate about a predetermined axis.

Figure 4:
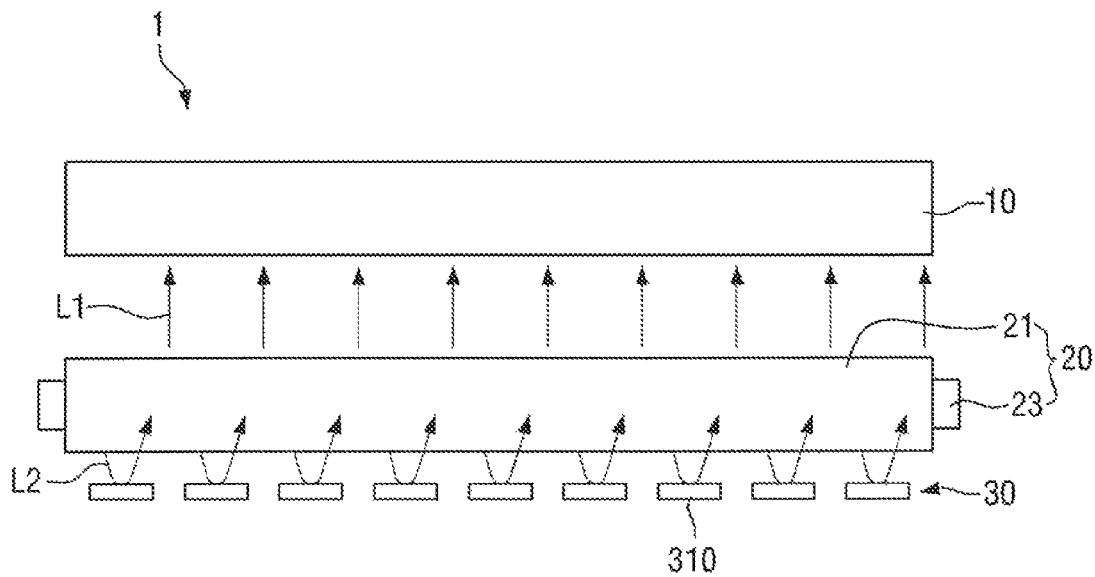
FIGS. 4 and 5 are cross-sectional views illustrating the operation of the display device illustrated in FIG. 1.
Figure 5:
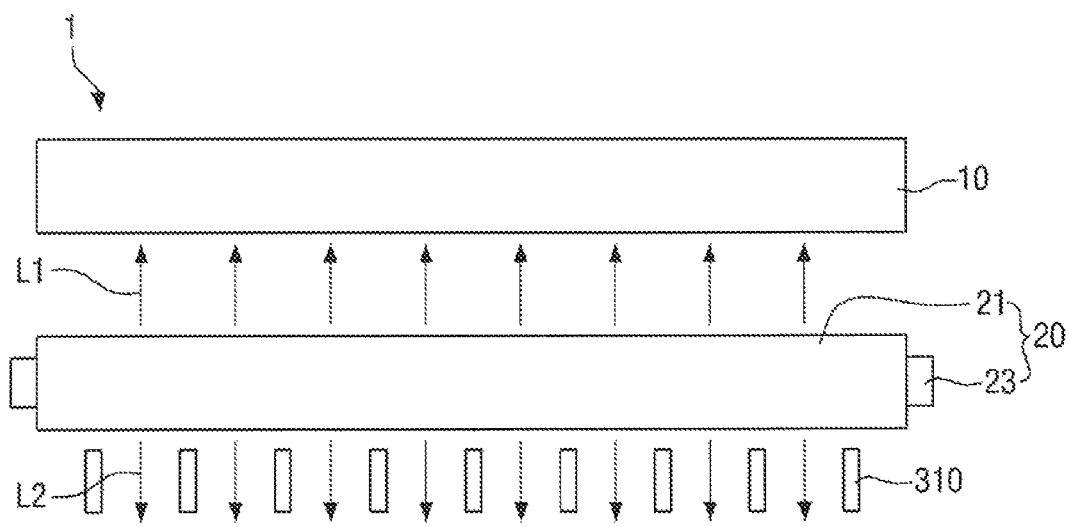

FIGS. 4 and 5 are cross-sectional views illustrating the operation of the display device 1 illustrated in FIG. 1. More specifically, FIG. 4 illustrates a cross-sectional view of the display device 1 in a display mode, and FIG. 5 illustrates a cross-sectional view of the display device 1 in a lighting mode.

Referring to FIGS. 4 and 5, the display device 1 may be selectively driven in the display mode and the lighting mode.

The display mode may be a mode of operation for displaying an image on the display panel 10, and the lighting mode may be a mode of operation for providing light emitted from the bottom of the backlight unit 20 to the outside of the display device 1. In the description that follows, it is assumed that no image is displayed on the display panel 10 when the display device 1 operates in the lighting mode, but the invention is not limited thereto. That is even in the lighting mode, an image may be displayed on the display panel 10.

In response to the display device 1 being driven in the display mode, the first light adjustment unit 30 may operate in the light reflection mode, as illustrated in FIG. 4. More specifically, in response to the display device 1 being driven in the display mode, light provided to the light guide panel 21 from the light source module 23 may be emitted from the top surface or the bottom surface of the light guide panel 21, and the display panel 10 may display an image with light emitted from the backlight unit 20.

The first reflection portions 310 may rotate to substantially form an angle of 0 or 180 degrees with the backlight unit 20 or the light guide panel 21, and the reflective surfaces of the first reflection portions 310 may be aligned to face the backlight unit 20. The space between the first reflection portions 310 may be substantially closed. As a result, light provided by the backlight unit 20 may be reflected by the first reflection portions 310, and may thus be provided back to the backlight unit 20 or the light guide panel 21.

In an exemplary embodiment, second light L2, which is emitted from the bottom surface of the light guide panel 21, may be reflected by the first reflection portions 310, and may thus be provided back to the backlight unit 20. As a result, the display panel 10 may be provided not only with first light L1, which is emitted from the top surface of the light guide panel 21, but also with at least part of the second light L2, Accordingly, the optical efficiency of the display device 1 may be improved.

In response to the display device 1 being driven in the lighting mode, the first light adjustment unit 310 may operate in the light transmission mode, as illustrated in FIG. 5. More specifically, in response to the display device 1 being driven in the light transmission mode, the reflective surfaces of the first reflection portions 310 may be aligned to substantially form an angle of 90 degrees with the backlight unit 20 or the light guide panel 21, and the space between the first reflection portions 310 may be substantially open. As a result, light provided by the backlight unit 20 may pass between the first reflection portions 310, and may thus be provided away from the backlight unit 20 or the light guide panel 21. As a result, the second light L2 may be emitted outward through the open space between the first reflection portions 310. Accordingly, the display device 1 may serve as a lighting device.

According to the exemplary embodiment of FIGS. 1 to 5, the display device may perform not only an image display function, but also a lighting function (e.g., an indoor lighting function). As such, since both an image display function and a lighting function can be realized with a single device, it is possible to make better use of space and realize cost-effectiveness benefits.

Figure 6:
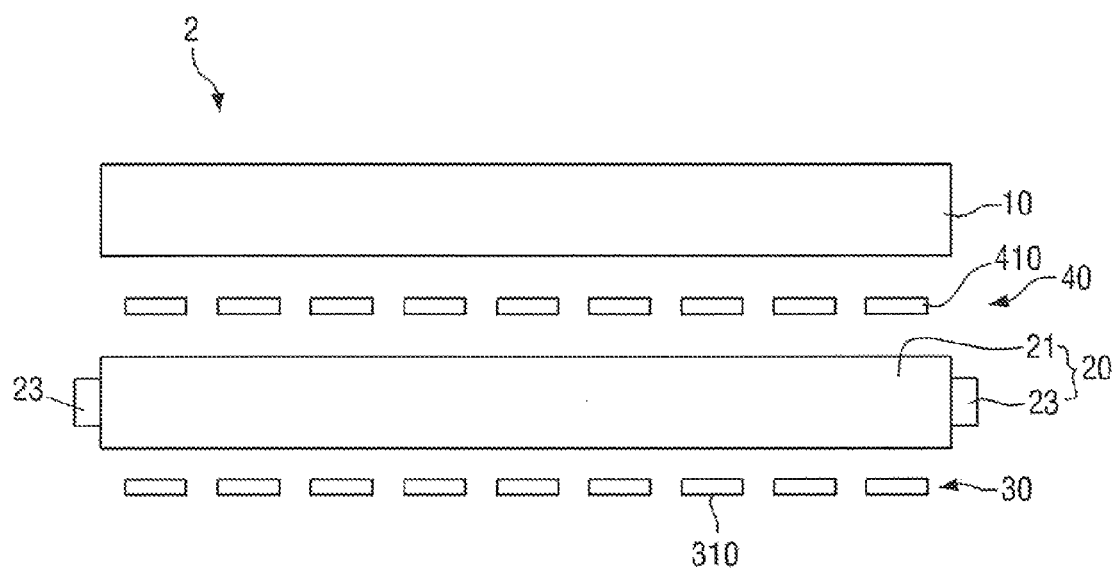
FIG. 6 is a cross-sectional view of a display device according to another exemplary embodiment of the invention.

FIG. 6 is a cross-sectional view of a display device according to another exemplary embodiment of the present invention.

Referring to FIG. 6, a display device 2 according to another embodiment of the present invention includes a display panel 10, a backlight unit 20, a first light adjustment unit 30, and a second light adjustment unit 40. The display device 2 differs from the display device 1 described above in that the display device 2 further includes the second light adjustment unit 40, and will be described focusing mainly on differences with the display device 1.

The second light adjustment unit 40 may be disposed between the backlight unit 20 and the display panel 10. The second light adjustment unit 40 may be switched between a light transmission mode and a light reflection mode, and may include a plurality of second reflection portions 410.

Each of the second reflection portions 410 may include a reflective surface (or a mirror) capable of reflecting light, and may be driven by a driving source to rotate. In an exemplary embodiment, the reflective surface may be formed of a metal, such as aluminum, but embodiments of the present invention are not limited thereto. The description of the first reflection portions 310 provided above is applicable to the second reflection portions 410, and, thus, a detailed description of the second reflection portions 410 will be omitted.

In an exemplary embodiment, the second light adjustment unit 40 may include a plurality of second supporting portions, the second reflection portions 410, which are rotatably provided inside the second supporting portions, respectively, a plurality of pairs of second torsion portions which rotatably connect the second reflection portions 410, respectively, to the second supporting portions, respectively, a plurality of groups of second coils, a plurality of third magnets, and a plurality of fourth magnets. The second supporting portions, the pairs of second torsion portions, the groups of second coils, the third magnets, and the fourth magnets may be substantially the same as the respective counterparts of the display device 1 described above with respect to FIGS. 2 and 3, and, thus, detailed descriptions thereof will be omitted.

Figure 7:
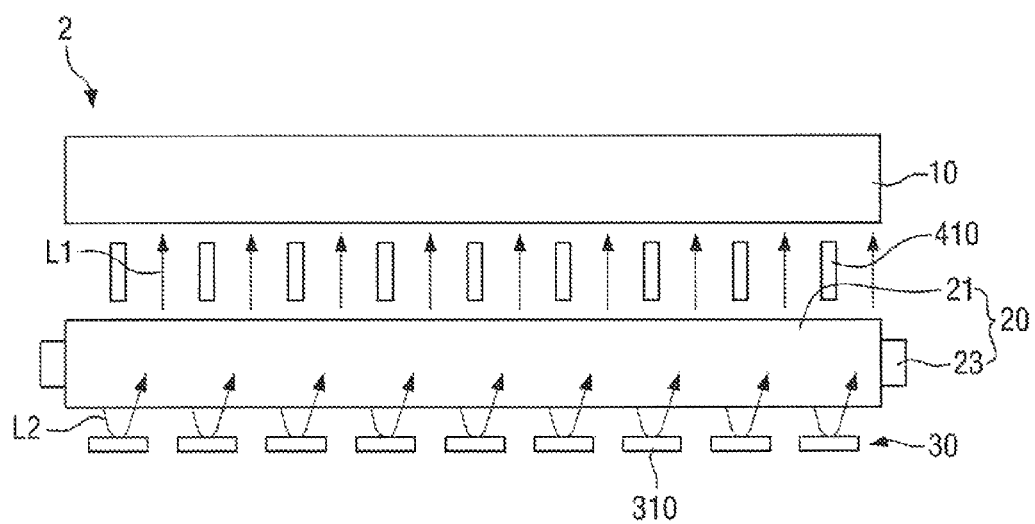
FIGS. 7 and 8 are cross-sectional views illustrating the operation of the display device illustrated in FIG. 6.
Figure 8:
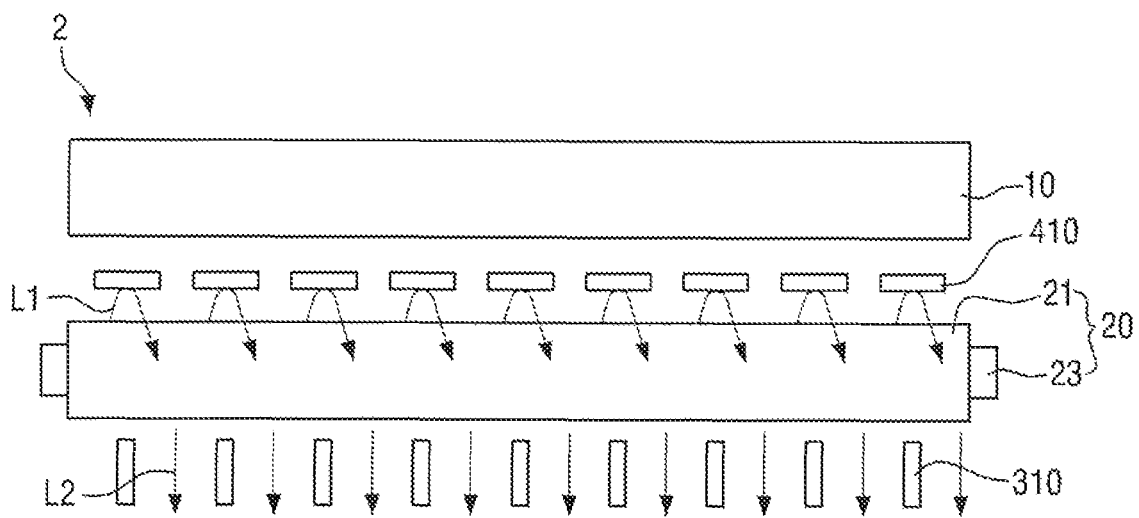

FIGS. 7 and 8 are cross sectional views illustrating the operation of the display device illustrated in FIG. 6.

Referring to FIGS. 7 and 8, the display device 2 may be selectively driven in a display mode and a lighting mode.

In response to the display device 2 being driven in the display mode, the first light adjustment unit 30 may operate in the light reflection mode, and the second light adjustment unit 40 may operate in the light transmission mode, as illustrated in FIG. 7. More specifically, in response to the display device 2 being driven in the display mode, light provided to a light guide panel 21 from a light source module 23 may be emitted from the top surface or the bottom surface of the light guide panel 21, and the display panel 10 may display an image with light emitted from the backlight unit 20.

The first reflection portions 310 may rotate to substantially form an angle of 0 or 180 degrees with the backlight unit 20 or the light guide panel 21, and the reflective surfaces of the first reflection portions 310 may be aligned to face the backlight unit 20. The space between the first reflection portions 310 may be substantially closed. As a result, light provided by the backlight unit 20 may be reflected by the first reflection portions 310, and, may thus be provided back to the backlight unit 20 or the light guide panel 21.

On the other hand, the reflective surfaces of the second reflection portions 410 may be aligned to substantially form an angle of 90 degrees with the backlight unit 20 or the light guide panel 21, and the space between the second, reflection portions 410 may be substantially open. As a result, light emitted from the backlight unit 20 may be provided to the display panel 10 through the open space between the second reflection portions 410.

In an exemplary embodiment, second light L2, which is emitted from the bottom surface of the light guide panel 21, may be reflected by the first reflection portions 310, and may thus be provided back to the backlight unit 20, and first light L1, which is emitted from the top surface of the light guide panel 21, may be provided to the display panel 10 through the open space between the second reflection portions 410. Accordingly, the display panel 10 may be provided not only with the first light L1, but also with at least part of the second light L2. Accordingly, the optical efficiency of the display device 2 may be improved.

In response to the display device 2 being driven in the lighting mode, the first light adjustment unit 30 may operate in the light transmission mode, and the second light adjustment unit 40 may operate in the light reflection mode, as illustrated in FIG. 8. More specifically, in response to the display device 2 being driven in the light transmission mode, the reflective surfaces of the first reflection portions 310 may be aligned to substantially form an angle of 90 degrees with the backlight unit 20 or the light guide panel 21, and the space between the first reflection portions 310 may be substantially open. As a result, the second light L2 may be emitted outward through the open space between the first reflection portions 310. Accordingly, the display device 2 may serve as a lighting device.

On the other hand, the second reflection portions 410 may rotate to substantially form an angle of 0 or 180 degrees with the backlight unit 20 or the light guide panel 21, and the reflective surfaces of the second reflection portions 410 may be aligned to face the backlight unit 20. The space between the second reflection portions 410 may be substantially closed. As a result, the first light LI may be reflected by the second reflection portions 410, and may thus be provided back to the backlight unit 20 or the light guide panel 21. Accordingly, not only the second light L2, but also at least part of the first light L1, which is reflected by the second reflection portions 410, may be emitted outward. Accordingly, the optical efficiency, particularly, as a lighting device, of the display device 2 may be improved.

Figure 9:
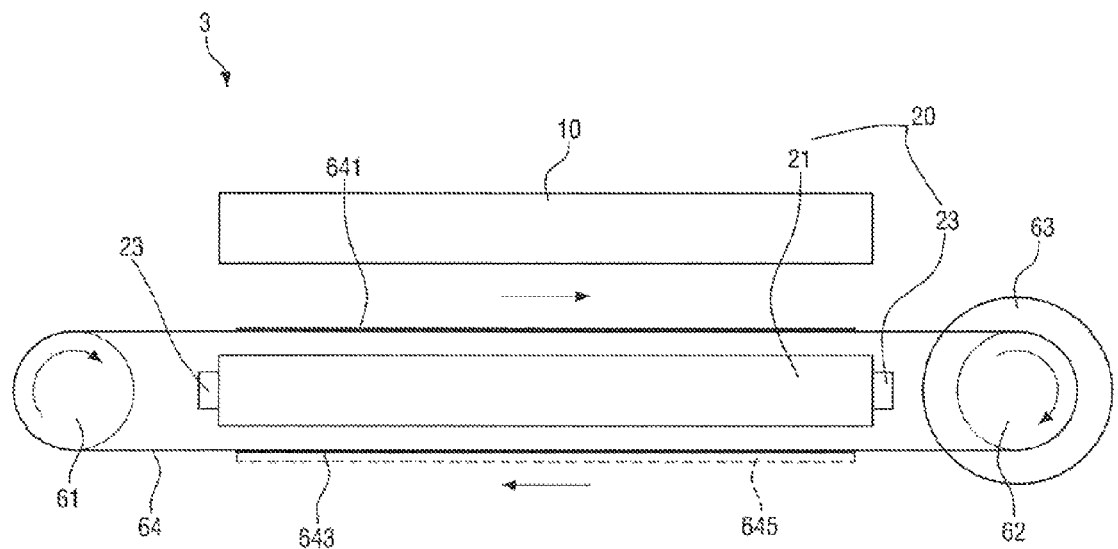
FIG. 9 is a cross-sectional view of a display device according to another exemplary embodiment of the invention.
Figure 10:
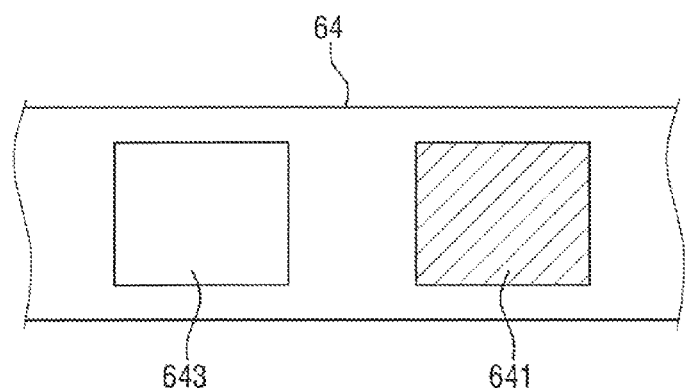
FIG. 10 is a top view of a light adjustment unit of the display device illustrated in FIG. 9, according to an exemplary embodiment of the invention.

FIG. 9 is a cross-sectional view of a display device according to another exemplary embodiment of the present invention; and FIG. 10 is a top view of a light adjustment unit of the display device illustrated in FIG. 9, according to an exemplary embodiment of the invention.

Referring to FIGS. 9 and 10, a display device 3 according to another embodiment of the present invention includes a display panel 10, a backlight unit 20, a first roller 61, a second roller 62, and a light adjustment unit 64, and may also include at least one of a driving unit 63 and one or more optical sheets 645.

The display panel 10 may be an LCD panel. The backlight unit 20, which provides light to the display panel 10, may include a light guide panel 21 and a light source module 23. The display panel 10 and the backlight unit 20 may be the same as the respective counterparts of the display device 1 described above with respect to FIG. 1, and thus, detailed descriptions thereof will be omitted.

The first roller 61 and the second roller 62, which are configured for moving the light adjustment unit 64, may be disposed on the left side and the right side, respectively, of the backlight unit 20.

The driving unit 63 may transmit a rotating driving force to at least one of the first roller 61 and the second roller 62, and may be connected to at least one of the first roller 61 and the second roller 62. The driving unit 63 is illustrated in FIG. 9 as being provided at the second roller 62 to transmit a rotating driving force to the second roller 62, but embodiments of the present invention are not limited thereto. For example, the driving unit 63 may be provided only at the first roller 61, or a plurality of driving units 63, such as two driving units 63, for example may be provided to correspond to the first roller 61 and the second roller 62, respectively. The driving unit 63 may include a well-known stepping, induction, or servo motor, but embodiments of the present invention are not limited thereto. For purposes of description, the driving unit 63 is described below as being provided only at the second roller 62.

The light adjustment unit 64 may have a ring-shaped structure. The light adjustment unit 64 may be disposed between, and coupled to, the first roller 61 and e second roller 62. That is, inner surfaces of the light adjustment unit 64 may contact outer surfaces of the first roller 61 and the second roller 62, and the light adjustment unit 64 may receive a rotating force from the first roller 61 or the second roller 62 and may thus be able to move or rotate.

The light adjustment unit 64 may be formed of a soft material, such as a film material, for example. The light adjustment unit 64 may be formed of a light-transmissive material, but embodiments of the present invention are not limited thereto.

The light adjustment unit 64 may include a light reflection portion 641, which reflects light provided by the backlight unit 20, and a light transmission portion 643, which transmits therethrough light provided by the backlight unit 20.

The light reflection portion 641, in one embodiment, may be formed by coating part of the light adjustment unit 64 with a light-reflective material, such as aluminum, for example, or by attaching a reflective film, such as an aluminum film, for example, on part of the light adjustment unit 64, but embodiments of the present invention are not limited thereto.

In one embodiment, the light adjustment unit 64 is formed of a non-light-transmissive material, and the light transmission portion 643 may be formed as an opening through the light adjustment unit 64. In another embodiment, the light adjustment unit 64 may be formed of a light-transmissive material and the light transmission portion 643 may be a part of the light adjustment unit 64 where the light reflection portion 641 is not formed. In another embodiment, the light adjustment unit 64 may be formed of a light-transmissive material, and the light transmission portion 643 may be formed to correspond to part of the light adjustment unit 64 where the light reflection portion 641 is not formed. For purposes of description, in the description that follows, it is assumed that the light transmission portion 643 is formed to correspond to part of the light adjustment unit 64 where the light reflection portion 641 is not formed, but embodiments of the present invention are not limited thereto.

Part of the light adjustment unit 64 may be disposed between the display panel 10 and the backlight unit 20, and another part of the light adjustment unit 64 may be disposed below the backlight unit 20.

The optical sheets 645 may be disposed on part of the light adjustment unit 64 where the light transmission portion 643 is formed. In an exemplary embodiment, the optical sheets 645 may include at least one of a diffusion sheet, a prism sheet, and a luminance-enhancing sheet, but embodiments of the present invention are not limited thereto.

Figure 11:
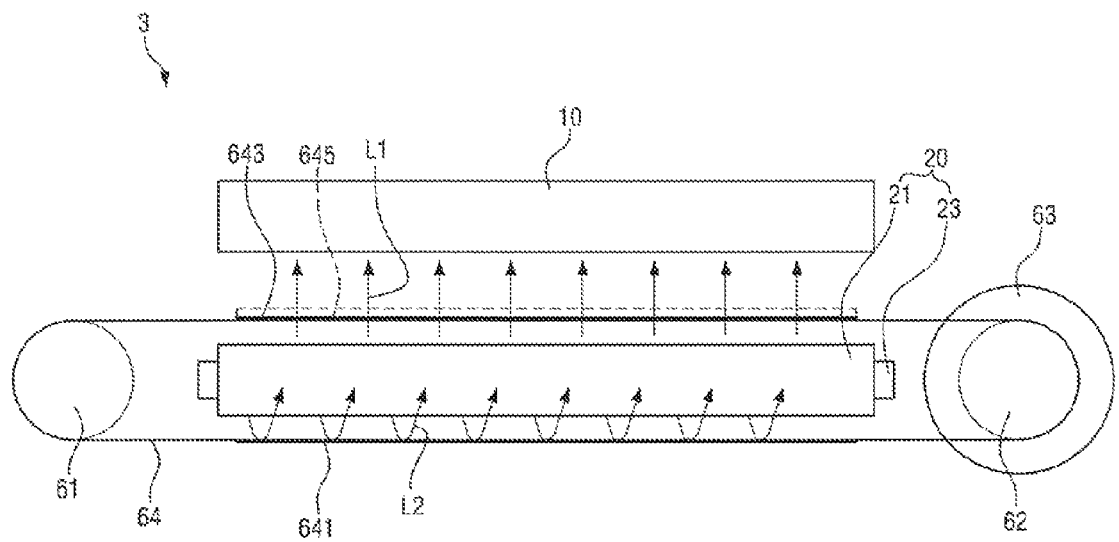
FIGS. 11 and 12 are cross-sectional views illustrating the operation of the display de vice illustrated in FIG. 9.
Figure 12:
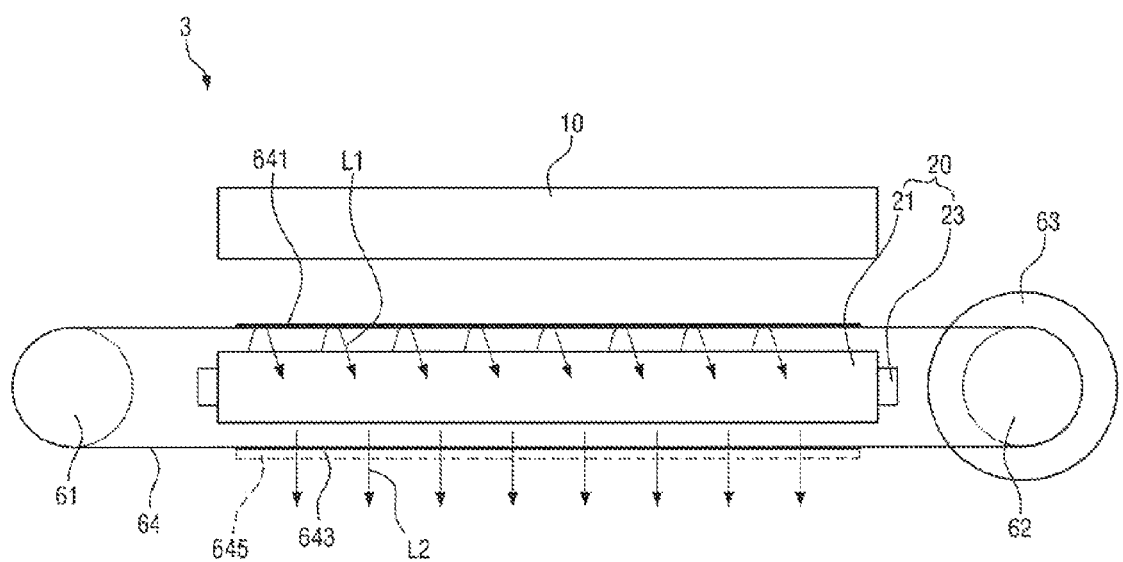

FIGS. 11 and 12 are cross-sectional views illustrating the operation of the display device 3 illustrated in FIG. 9.

Referring to FIGS. 11 and 12, the display device 3 may be selectively driven in a display mode and a lighting mode.

In response to the display device 3 being driven in the display mode, light provided to the light guide panel 21 from the light source module 23 may be emitted from the top surface or the bottom surface of the light guide panel 21, and the display panel 10 may display an image with light emitted from the backlight unit 20.

In response to the display device 3 being driven in the display mode, the driving unit 63 may rotate the second roller 62. Due to the rotation of the second roller 62, the light adjustment unit 64 may be moved such that, as illustrated in FIG. 11, the light transmission portion 643 may be located between the display panel 10 and the backlight unit 20, and the light reflection portion 641 may be located below the backlight unit 20.

As a result, light emitted from the top of the backlight unit 20, i.e. first light L1, may transmit through the light transmission portion 643 and may thus be provided to the display panel 10. Light emitted from the bottom of the backlight unit 20, i.e. second light L2, may be reflected by the light reflection portion 641 and may thus be provided back to the backlight unit 20. Accordingly, not only the first light L1, but also at least part of the second light L2, may be provided to the display panel 10. Therefore, the optical efficiency of the display device 3 may be improved.

The optical sheets 645 may be provided at part of the light adjustment unit 64 where the light transmission portion 643 is provided. In an exemplary embodiment, in response to the optical sheets 645 including a diffusion sheet, the uniformity of light provided to the display panel 10 through the light transmission portion 643 may be improved.

In response to the display device 3 being driven in the lighting mode, the driving unit 63 may rotate the second roller 62. Due to the rotation of the second roller 62, the light adjustment unit 64 may be moved such that, as illustrated in FIG. 12, the light reflection portion 641 may be located between the display panel 10 and the backlight unit 20, and the light transmission portion 643 may be located below the backlight unit 20.

As a result, light emitted from the bottom of the backlight unit 20, i.e. second light L2, may transmit through the light transmission portion 643 and may thus be emitted outward, and the display device 3 may serve as a lighting device. Light emitted from the top of the backlight unit 20, i.e. first light L1, may be reflected by the light reflection portion 641 and may thus be provided back to the backlight unit 20. Accordingly, not only the second light L2, but also at least part of the first light L1 reflected by the light reflection portion 641, may be emitted outward. Therefore, the optical efficiency, particularly, as a lighting device, of the display device 3 may be improved.

The optical sheets 645 may be provided at part of the light adjustment unit 64 where the light transmission portion 643 is provided. In an exemplary embodiment, in response to the optical sheets 645 including a diffusion sheet, the uniformity of light emitted outward through the light transmission portion 643 may be improved. Since the optical sheets 645 can be used for both the display mode and the lighting mode, there is no need to provide optical sheets separately for the display mode and for the lighting mode. Therefore, the number of parts of the display device 3 may be reduced.

While the present invention has been particularly shown and described with reference to some exemplary embodiments thereof, it will be understood by those of ordinary skill in the art that various changes in detail may be made therein without departing from the spirit and scope of the present invention as defined by the following claims and equivalents thereof. The exemplary embodiments should be considered in a descriptive sense only and not for purpose of limitation.

What is claimed is:

1. A display device comprising:
a display panel,
a backlight unit configured to provide light to the display panel, the display panel being arranged at a side of a first surface of the backlight unit; and
a first light adjustment unit configured to be arranged at a side of a second surface of the backlight unit opposite to the first surface of the backlight unit the first light adjustment unit comprising a plurality of first reflection portions, first reflection portions of the plurality of first reflection portions being rotatable so as to be switchable between a light transmission mode and a light reflection mode.

2. The display device of claim wherein the first light adjustment unit further comprises a plurality of first supporting portions; and a plurality of pairs of first torsion portions rotatably supporting the first reflection portions within the first supporting portions, wherein the first reflection portions are rotatably arranged inside respective first supporting portions of the plurality of first supporting portions.

3. The display device of claim 2, wherein each of the first reflection portions comprises one or more first coils, and the first light adjustment unit further comprises a plurality of first magnets arranged at a side of the first reflection portions, respectively, and a plurality of second magnets arranged at another side of the first reflection portions, respectively, and having different polarity from the first magnets.

4. The display device of claim 1, wherein the first light adjustment unit is configured to be driven to the light reflection mode and reflect light provided by the backlight unit in response to an image being displayed on the display panel.

5. The display device of claim 1, wherein the first light adjustment unit is configured to be driven to the light transmission mode and transmit light provided by the backlight unit through the first light adjustment unit in response to no image being displayed on the display panel.

6. The display device of claim 1, further comprising a second light adjustment unit configured to be arranged between the display panel and the backlight unit and configured to be switchable between the light transmission mode and the light reflection mode.

7. The display device of claim wherein the second light adjustment unit comprises a plurality of second supporting portions; a plurality of second reflection portions rotatably arranged inside the second supporting portions, respectively, and a plurality of pairs of second torsion portions rotatably supporting the second reflection portions, respectively, within the second supporting portions, respectively.

8. The display device of claim 7, wherein each of the second reflection portions comprises one or more second coils, and the second light adjustment unit further comprises a plurality of third magnets arranged at a side of the second reflection portions, respectively, and a plurality of fourth magnets arranged at another side of the second reflection portions, respectively, and having different polarity from the third magnets.

9. The display device of claim 6, wherein the first light adjustment unit is red to be driven to the light reflection mode and reflect light provided by the backlight unit in response to an image being displayed on the display panel, and the second light adjustment unit is configured to be driven to the light transmission mode and transmit light provided by the backlight unit through the second light adjustment unit in response to an image being displayed on the display panel.

10. The display device of claim 6, wherein the first light adjustment unit is configured to be driven to the light transmission mode and transmit light provided by the backlight unit through the first light adjustment unit in response to no image being displayed on the display panel, and the second light adjustment unit is configured to be driven to the light reflection mode and reflect light provided by the backlight unit in response to no image being displayed on the display panel.

11. The display device of claim 1, wherein the backlight unit comprises a light guide panel configured to emit light incident thereupon through a side thereof, through the first and second surfaces thereof, and a light source module arranged at at least one side of the light guide panel.

12. A display device comprising:
a display panel;
a backlight unit configured to provide light to the display panel, the display panel being arranged at a side of a first surface of the backlight unit;
a first roller configured to be arranged at a first side of the backlight unit;
a second roller configured to be arranged at a second side of the backlight unit; and
a light adjustment unit configured to be arranged at least in part between the display panel and the backlight unit and configured to be connected to the first roller and the second roller,
wherein the light adjustment unit comprises light reflection portion and a light transmission portion.

13. The display device of claim 12, further comprising a driving unit configured to transmit a rotating force to at least one of the first roller and the second roller.

14. The display device of claim 13, wherein the driving unit comprises at least one of a stepping motor, an induction motor, and a servo motor.

15. The display device of claim 12, wherein, in response to an image being displayed on the display panel, the light transmission portion is located between the display panel and the backlight unit and transmits light provided by the backlight unit through the light transmission portion, and the light reflection portion is located on a side of a second surface of the backlight unit opposite to the first surface of the backlight unit, and reflects light provided by the backlight unit.

16. The display device of claim 12, wherein, in response to no image being displayed on, the display panel, the light reflection portion is located between the display panel and the backlight unit and reflects light provided by the backlight unit, and the light transmission portion is located at a side of a second surface of the backlight unit opposite to the first surface of the backlight unit, and transmits light provided by the backlight unit through the light transmission portion.

17. The display device of claim 12 wherein the light adjustment unit comprises a film material.

18. The display device of claim 12, further comprising one or more optical sheets configured to be provided on a part of the light adjustment unit where the light transmission portion is formed.

19. The display device of claim 18, wherein the one or more optical sheets include at least one of a diffusion sheet, a prism sheet, and a luminance-enhancing sheet.

20. The display device of claim 12, wherein the backlight unit comprises a light guide panel configured to emit light incident thereupon through a side thereof, through the first surface and a second surface opposite the first surface, and a light source module arranged at at least one side of the light guide panel.

\* \* \* \* \*